(12) United States Patent
Ohmori et al.

(10) Patent No.: US 9,999,832 B2
(45) Date of Patent: Jun. 19, 2018

(54) GAME SYSTEM, COMPUTER-READABLE NON-TRANSITORY STORAGE MEDIUM, GAME PROCESSING METHOD AND GAME APPARATUS

(71) Applicants: Shigeru Ohmori, Tokyo (JP); Toru Nagihashi, Tokyo (JP)

(72) Inventors: Shigeru Ohmori, Tokyo (JP); Toru Nagihashi, Tokyo (JP)

(73) Assignees: Nintendo Co., Ltd., Kyoto (JP); Game Freak, Inc., Tokyo (JP)

( * ) Notice: Subject to any disclaimer, the term of this patent is extended or adjusted under 35 U.S.C. 154(b) by 0 days. days.

(21) Appl. No.: 13/785,656

(22) Filed: Mar. 5, 2013

(65) Prior Publication Data

US 2013/0281200 A1    Oct. 24, 2013

(30) Foreign Application Priority Data

Apr. 19, 2012  (JP) ................. 2012-095897
Apr. 19, 2012  (JP) ................. 2012-095900

(51) Int. Cl.
  A63F 9/24     (2006.01)
  A63F 13/40    (2014.01)
  A63F 13/69    (2014.01)
  A63F 13/88    (2014.01)
  A63F 13/42    (2014.01)

(52) U.S. Cl.
  CPC .............. *A63F 13/10* (2013.01); *A63F 13/69* (2014.09); *A63F 13/88* (2014.09); *A63F 13/42* (2014.09)

(58) Field of Classification Search
  CPC ...... G07F 17/00; G07F 17/3225; A63F 13/12; A63F 9/24
  See application file for complete search history.

(56) References Cited

U.S. PATENT DOCUMENTS

| | | |
|---|---|---|
| 6,320,110 B1 | 11/2001 | Ishikawa |
| 7,247,781 B2 | 7/2007 | Ikeya |
| 7,406,355 B1 | 7/2008 | Morita |
| 7,465,231 B2 | 12/2008 | Lewin |
| 7,867,094 B1 * | 1/2011 | Wisdom et al. ............... 463/43 |
| 8,128,476 B1 | 3/2012 | Sidhu et al. |

(Continued)

FOREIGN PATENT DOCUMENTS

| | | |
|---|---|---|
| JP | 11226264 A | 8/1999 |
| JP | 4559591 | 7/2010 |

OTHER PUBLICATIONS

Oct. 28, 2013 Office Action in U.S. Appl. No. 13/793,300, 15 pages.
(Continued)

*Primary Examiner* — James S McClellan
*Assistant Examiner* — Kevin Carter
(74) *Attorney, Agent, or Firm* — Nixon & Vanderhye, P.C.

(57) ABSTRACT

A first game execution unit executes a first game. A second game execution unit executes a second game. The second game execution unit sets particular first game data or a first game mode which is accessible in the first game so as to be inaccessible in the second game when an execution result of the first game does not satisfy a predetermined condition, and sets the particular first game data or the first game mode so as to be accessible also in the second game in response to the execution result of the first game having satisfied the predetermined condition.

16 Claims, 7 Drawing Sheets

| VERSION A | |
|---|---|
| KEY | OBTAINING CONDITION |
| EASY MODE KEY | SATISFY CONDITION A1 |
| DIFFICULT MODE KEY | NOT AVAILABLE |
| A TOWN KEY | SATISFY CONDITION A2 |
| B TOWN KEY | NOT AVAILABLE |

(56) References Cited

U.S. PATENT DOCUMENTS

| | | | |
|---|---|---|---|
| 8,589,905 B2* | 11/2013 | Miwa et al. | 717/170 |
| 8,632,412 B2 | 1/2014 | Cooper | |
| 8,662,997 B1 | 3/2014 | McCuller | |
| 8,806,659 B1* | 8/2014 | Miazzo | G06F 21/10 726/30 |
| 2003/0109296 A1 | 6/2003 | Leach et al. | |
| 2003/0109297 A1 | 6/2003 | Fukutome | |
| 2004/0235567 A1* | 11/2004 | Chatani | A63F 13/12 463/42 |
| 2006/0063590 A1* | 3/2006 | Abassi et al. | 463/29 |
| 2007/0111802 A1 | 5/2007 | Ishihara et al. | |
| 2007/0155506 A1* | 7/2007 | Malik | 463/42 |
| 2007/0197283 A1* | 8/2007 | Hartwell | 463/29 |
| 2008/0009345 A1 | 1/2008 | Bailey | |
| 2009/0170593 A1* | 7/2009 | Pacey | G07F 17/32 463/25 |
| 2009/0172659 A1* | 7/2009 | Oberg et al. | 717/178 |
| 2009/0318215 A1* | 12/2009 | Acres | G07F 17/323 463/20 |
| 2010/0075759 A1* | 3/2010 | Kawabata | 463/42 |
| 2010/0113154 A1* | 5/2010 | Leingang | A63F 13/12 463/40 |
| 2010/0234096 A1 | 9/2010 | Hazama et al. | |
| 2012/0015715 A1 | 1/2012 | Luxton et al. | |
| 2012/0172132 A1 | 7/2012 | Molyneaux | |
| 2012/0184351 A1* | 7/2012 | Hornik | G07F 17/3274 463/25 |
| 2013/0184073 A1 | 7/2013 | Uchiyama | |

OTHER PUBLICATIONS

Office Action in U.S. Appl. No. 13/793,300 dated Nov. 21, 2014.
Office Action related to U.S. Appl. No. 13/793,300 dated May 9, 2014.
WIKI, "Second Quest"; https://web.archive.org/web/20110221140702/http://www.zeldawiki.org/Second ...Mar. 22, 2014, pp. 1-5.
Office Action in corresponding U.S. Appl. No. 13/793,300 dated Mar. 27, 2015.
Office Action in corresponding U.S. Appl. No. 13/793,300 dated Sep. 28, 2015.
Office Action dated Mar. 27, 2017 in related U.S. Appl. No. 13/793,300.
Office Action in corresponding U.S. Appl. No. 13/793,300 dated Sep. 22, 2016.
Pocket Monsters FireRed/LeafGreen National Pokédex, Shogakukan Inc., Jun. 9, 2004, pp. 22-25 with partial English translation; <http://www.21010.net/club/bn/agb/bprj2/index.html#y2004>.
Pocket Monsters FireRed/LeafGreen Nintendo official guidebook, Shogakukan Inc., Apr. 10, 2004, 1$^{st}$ edition, p. 22 with partial English translation.
Shusuke Motomiya & Oneup, Pocket Monsters FireRed/Leaf/Green koushiki kanzen clear guide, Media Factory, Inc., Mar. 19, 2004, 1$^{st}$ edition, pp. 193, 210-211 with partial English translation.
Pokémon National Pokédex wo kansei saseyo!, Dengeki GameCube, MediaWorks, Inc., Jun. 1, 2004, 4$^{th}$ volume, issue No. 6, pp. 8-21 with partial English translation.
Hiroshi Hirata (and seven others), SE-MOOK PlayStation version Dragon Quest Monsters 1 & 2 Hoshifuri No Yuja to Bokujo No Nakamatachi official guidebook, Square Enix Holdings Co., Ltd., Jun. 10, 2004, 7$^{th}$ printing, pp. 332-335 with partial English translation.
Sansai Mook, vol. 279 "Game yarikomi MAX", SansaiBooks Company, Limited, Mar. 2, 2010, 1$^{st}$ edition, pp. 68-73 with partial English translation.
Wonder Life Special [Nintendo official guidebook] Mario Party 8, Shogakukan Inc., Sep. 13, 2007, 1st Edition, pp. 10-19, 23-24 with partial English translation.
Mario Party 8, Nintendo Dream, Mainichi Communications Inc., Oct. 1, 2007, 12$^{th}$ volume, issue No. 10, pp. 76-79 with partial English translation.
Mario Party 8, Nintendo Dream for March, a special supplement 2 complete edition latest hit softwares ▲ Toku ▼ Netadaizen' 08, Mainichi Communications Inc., Mar. 1, 2008, 13$^{th}$ volume, issue No. 3, pp. 14-16 with partial English translation.
Mario Party 8, Famitsu DS+Wii, Enterbrain Inc., Oct. 1, 2007, 9$^{th}$ volume, issue No. 10, pp. 92-97 with partial English translation.
Office Action in corresponding Japanese Patent Application No. JP2012-095900 dated May 27, 2016.
Office Action in corresponding Japanese Patent Application No. JP2012-095897 dated May 27, 2016.

* cited by examiner

FIG. 7

| VERSION A | |
|---|---|
| KEY | OBTAINING CONDITION |
| EASY MODE KEY | SATISFY CONDITION A1 |
| DIFFICULT MODE KEY | NOT AVAILABLE |
| A TOWN KEY | SATISFY CONDITION A2 |
| B TOWN KEY | NOT AVAILABLE |

FIG. 8

| VERSION B | |
|---|---|
| KEY | OBTAINING CONDITION |
| EASY MODE KEY | NOT AVAILABLE |
| DIFFICULT MODE KEY | SATISFY CONDITION B1 |
| A TOWN KEY | NOT AVAILABLE |
| B TOWN KEY | SATISFY CONDITION B2 |

GAME SYSTEM, COMPUTER-READABLE NON-TRANSITORY STORAGE MEDIUM, GAME PROCESSING METHOD AND GAME APPARATUS

CROSS REFERENCE TO RELATED APPLICATION

The disclosures of Japanese Patent Application No. 2012-095897 and Japanese Patent Application No. 2012-095900, filed on Apr. 19, 2012, are incorporated herein by reference.

FIELD

The technology shown here relates to a game system, a computer-readable non-transitory storage medium, a game processing method and a game apparatus.

BACKGROUND AND SUMMARY

Conventionally, a technology for incorporating a play result of one game into another game is known.

An objective of the present technology is to provide a game system, a computer-readable non-transitory storage medium, a game processing method and a game apparatus which are novel. More particularly, the objective of the present technology is to provide, for example, a game system, a computer-readable non-transitory storage medium, a game processing method and a game apparatus which can improve convenience when playing two games.

The above objective can be attained by, for example, exemplary configurations below.

A first exemplary configuration is a game system including a single or a plurality of game apparatuses. The game system comprises: at least one input unit; a first game execution unit which executes a first game in accordance with an instruction of a user inputted via the input unit; and a second game execution unit which executes a second game in accordance with an instruction of the user inputted via the input unit. The second game execution unit includes a second setting unit which sets particular first game data or a first game mode which is accessible in the first game so as to be inaccessible in the second game when an execution result of the first game does not satisfy a predetermined condition, and sets the particular first game data or the first game mode so as to be accessible also in the second game in response to the execution result of the first game having satisfied the predetermined condition.

The first game execution unit may include: a first determination unit which determines whether the execution result of the first game satisfies the predetermined condition; a first data output enabling unit which enables output of predetermined first data indicating that the execution result of the first game satisfies the predetermined condition in response to the execution result of the first game having satisfied the predetermined condition; and a first data output unit which outputs the first data, and the second game execution unit may include a first data input unit which receives the first data. The second setting unit may set the particular first game data or the first game mode which is accessible in the first game so as to be inaccessible in the second game when the first data is yet to be received, and set the particular first game data or the first game mode so as to be accessible also in the second game in response to the first data having been received.

The first data output unit may transmit a signal representing the first data via wireless communication, thereby outputting the first data, and the first data input unit may receive the signal via wireless communication, thereby receiving the first data.

The second setting unit may set a particular faculty or area existing in a game world of the first game so as to be inaccessible in the second game when the execution result of the first game does not satisfy the predetermined condition, and set the particular faculty or area so as to be accessible also in the second game in response to the execution result of the first game having satisfied the predetermined condition.

The second setting unit may set a game mode of a particular degree of difficulty which is accessible in the first game so as to be inaccessible in the second game when the execution result of the first game does not satisfy the predetermined condition, and set the game mode of the particular degree of difficulty so as to be accessible also in the second game in response to the execution result of the first game having satisfied the predetermined condition.

The first game execution unit may include a first display control unit which causes a display device to display a setting change screen for urging the player to select whether or not to use the particular first game data or the first game mode. The first display control unit may cause the display device to display the setting change screen in a different display mode in accordance with whether the particular first game data or the first game mode is set so as to be accessible by the second setting unit.

The first game execution unit may include a first setting unit which sets particular second game data or a second game mode which is accessible in the second game so as to be inaccessible in the first game when an execution result of the second game does not satisfy a second predetermined condition, and sets the particular second game data or the second game mode so as to be accessible also in the first game in response to the execution result of the second game having satisfied the second predetermined condition.

The game system may comprise: a first game apparatus which includes the input unit and the first game execution unit; and a second game apparatus which includes the input unit and the second game execution unit.

The game system may comprise: a first storage medium having stored therein a first game program for causing the game apparatus to function as the first game execution unit; and a second storage medium having stored therein a second game program for causing the game apparatus to function as the second game execution unit. The game apparatus may be able to selectively access to one of the first storage medium and the second storage medium.

The first game and the second game may be different versions of a same game title.

A second exemplary configuration is a computer-readable non-transitory storage medium having stored therein a game program to be executed in a game system including a single or a plurality of game apparatuses and comprising at least one input unit. The game program causes a computer of the game apparatus to execute: a first game execution process of executing a first game in accordance with an instruction of a user inputted via the input unit; and a second game execution process of executing a second game in accordance with an instruction of the user inputted via the input unit. The second game execution process includes a second setting process of setting particular first game data or a first game mode which is accessible in the first game so as to be inaccessible in the second game when an execution result of the first game does not satisfy a predetermined condition, and setting the particular first game data or the first game mode so as to be accessible also in the second game in response to the execution result of the first game having satisfied the predetermined condition.

The game program may be stored in any computer-readable storage medium (e.g., a flexible disk, a hard disk, an optical disk, a magneto-optical disc, a CD-ROM, a CD-R, a magnetic tape, a semiconductor memory card, a ROM, a RAM, and the like).

A third exemplary configuration is a game processing method performed in a game system including a single or a plurality of game apparatuses and comprising at least one input unit. The game processing method comprises: executing a first game process in accordance with an instruction of a user inputted via the input unit; and executing a second game process in accordance with an instruction of the user inputted via the input unit. The second game process includes a second setting process of setting particular first game data or a first game mode which is accessible in the first game process so as to be inaccessible in the second game process when an execution result of the first game process does not satisfy a predetermined condition, and setting the particular first game data or the first game mode so as to be accessible also in the second game process in response to the execution result of the first game process having satisfied the predetermined condition.

A fourth exemplary configuration is a game apparatus comprising: an input unit; a first game execution unit which executes a first game in accordance with an instruction of a player inputted via the input unit; and a second game execution unit which executes a second game in accordance with an instruction of the player inputted via the input unit. The second game execution unit includes a second setting unit which sets particular first game data or a first game mode which is accessible in the first game so as to be inaccessible in the second game when an execution result of the first game does not satisfy a predetermined condition, and sets the particular first game data or the first game mode so as to be accessible also in the second game in response to the execution result of the first game having satisfied the predetermined condition.

According to the present technology, particular first game data or a first game mode which is accessible in a first game becomes accessible also in a second game.

BRIEF DESCRIPTION OF THE DRAWINGS

FIG. 3 is a diagram illustrating a non-limiting example of an image displayed on a hand-held game apparatus 10a;

FIG. 4 is a diagram illustrating a non-limiting example of an image displayed on the hand-held game apparatus 10a;

FIG. 5 is a diagram illustrating a non-limiting example of an image displayed on the hand-held game apparatus 10a;

FIG. 6 is a diagram illustrating a non-limiting example of an image displayed on the hand-held game apparatus 10a;

FIG. 7 is a diagram illustrating a non-limiting example of obtaining conditions of respective keys in a game of a version A;

FIG. 8 is a diagram illustrating a non-limiting example of obtaining conditions of respective keys in a game of a version B;

FIG. 9 is a diagram illustrating a non-limiting example of an image displayed on the hand-held game apparatus 10a;

FIG. 10 is a diagram illustrating a non-limiting example of a program and information stored in a main memory 15a of the hand-held game apparatus 10a;

DETAILED DESCRIPTION OF NON-LIMITING EXAMPLE EMBODIMENTS

Hereinafter, an exemplary embodiment of the present technology will be described.

Figure 1:
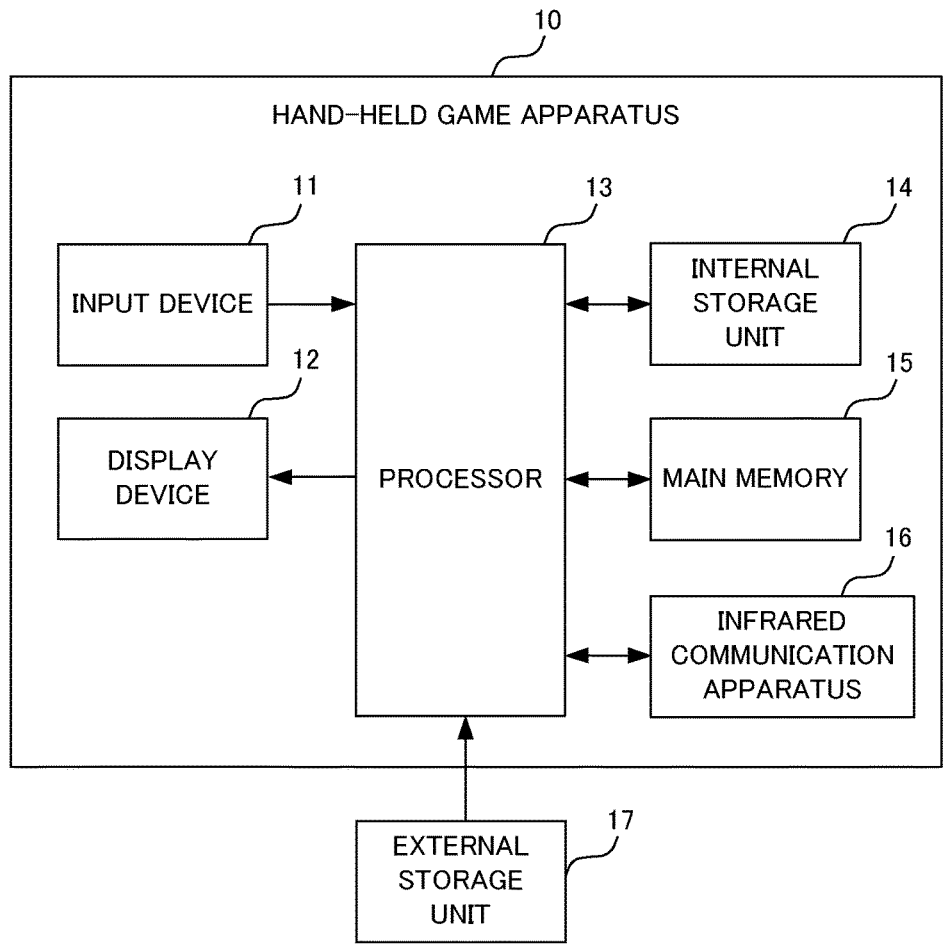
FIG. 1 is a block diagram illustrating a non-limiting example of a configuration of a hand-held game apparatus 10.

In FIG. 1, a hand-held game apparatus 10 includes an input device 11, a display device 12, a processor 13, an internal storage unit 14, a main memory 15, and an infrared communication device 16.

The input device 11 is operated by a user and outputs a signal based on an operation by the user. The input device 11 is, for example, a cross switch, a push button, or a touch panel.

The display device 12 displays an image generated by the hand-held game apparatus 10 on a screen. Typically, the display device 12 is a liquid crystal display.

The internal storage unit 14 stores a computer program executed by the processor 13. Typically, the internal storage unit 14 is a flash EEPROM.

The main memory 15 temporarily stores the computer program and information.

The infrared communication device 16 is used for conducting infrared communication with another hand-held game apparatus. The infrared communication device 16 transmits/receives an infrared signal to/from the other hand-held game apparatus.

The processor 13 executes predetermined processing in accordance with the computer program stored in the internal storage unit 14 or an external storage unit 17.

Figure 2:
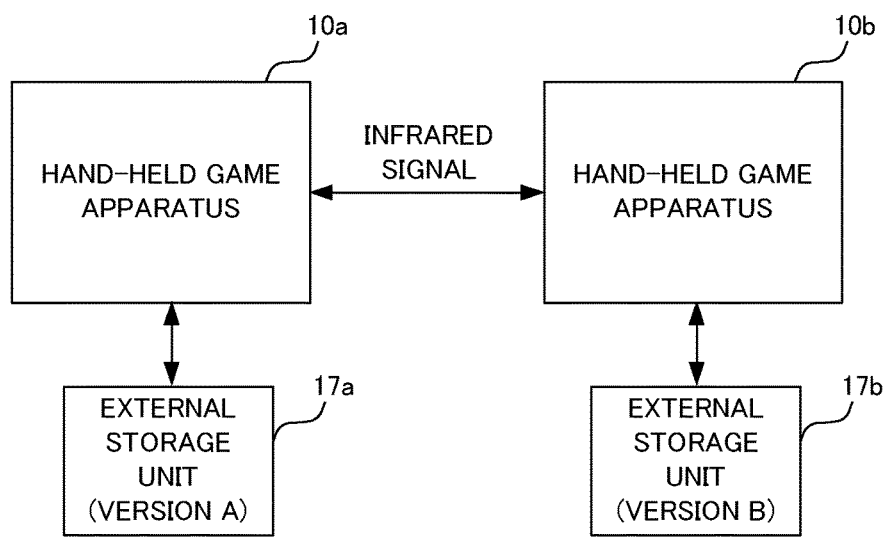
FIG. 2 is a block diagram illustrating a non-limiting example of a configuration of a game system.

In the exemplary embodiment, a game system including two hand-held game apparatuses 10a, 10b as shown in FIG. 2 will be described. In the following description, components of the hand-held game apparatus 10a are denoted respectively by the reference numerals shown in FIG. 1 each with a suffix letter "a" while components of the hand-held game apparatus 10b are denoted respectively by the reference numerals shown in FIG. 1 each with a suffix letter "b," as appropriate, thereby discriminating between the components of the hand-held game apparatus 10a and the components of the hand-held game apparatus 10b.

Each of the hand-held game apparatus 10a and the hand-held game apparatus 10b has a configuration similar to that of the hand-held game apparatus 10 shown in FIG. 1. An external storage unit 17a is attached to the hand-held game apparatus 10a while an external storage unit 17b is attached to the hand-held game apparatus 10b. The hand-held game apparatus 10a and the hand-held game apparatus 10b conduct infrared communication using the infrared communication device 16, thereby transmitting/receiving "keys" described below.

In the external storage unit 17a, a game program of a version A of one game title is stored. Meanwhile, in the external storage unit 17b, a game program of a version B of the game title is stored. The version A and the version B are basically the same in story line but different from each other in some points. For example, both of the version A and the version B are role-playing games set in basically the same game world. However, in the version A, a town called "A town" is located at a predetermined position in the game world while, in the version B, a town called "B town" is located at the predetermined position in the game world instead of the "A town." The "A town" and the "B town" not only have different names from each other but also have located therein different non-player characters, faculties, and the like.

Next, an outline of an operation of the hand-held game apparatus 10 will be described.

The hand-held game apparatus 10 executes a predetermined game (e.g., the role-playing game described above) based on the game program stored in the external storage unit 17. The user can call up a "key-related menu" screen at any timing during a game play. The "key-related menu" screen can be called up in both of the game program of the version A and the game program of the version B. In the following description, a case of the hand-held game apparatus 10a will be described.

Figure 3:
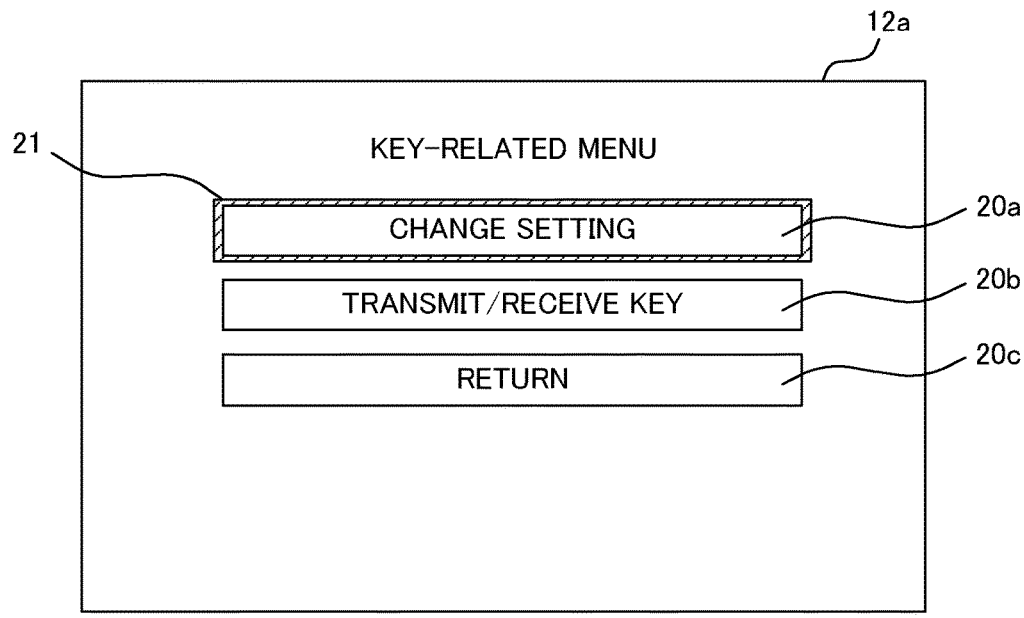

FIG. 3 shows an example of the "key-related menu" screen displayed on a display device 12a based on an instruction of the user (hereinafter, referred to as user A for the sake of convenience) of the hand-held game apparatus 10a. On the "key-related menu" screen, three options 20a to 20c and a cursor 21 are displayed.

Figure 4:
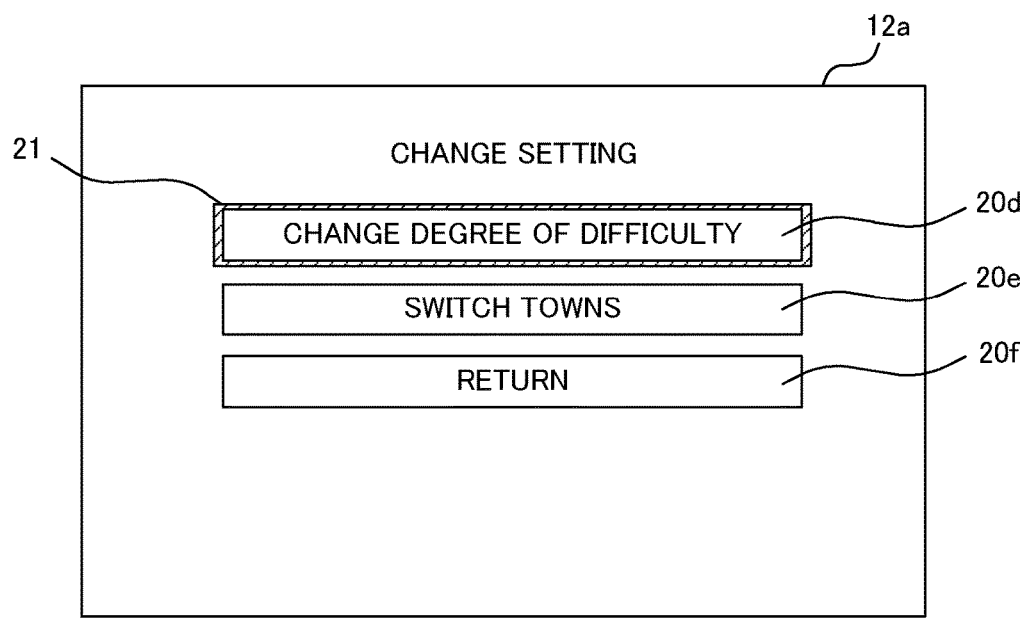

When the user A selects the options 20a of "change setting" in FIG. 3, a "change setting" screen shown in FIG. 4 is displayed. On the "change setting" screen, three options 20d to 20f and the cursor 21 are displayed.

Figure 5:
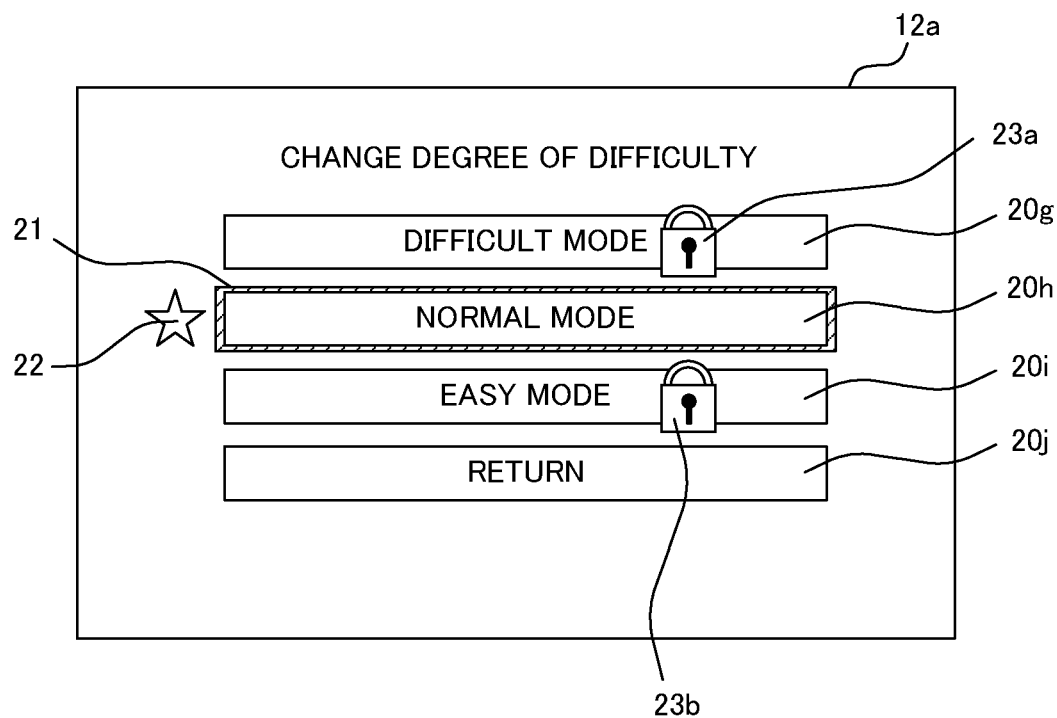

When the user A selects the option 20d of "change degree of difficulty" in FIG. 4, a "change degree of difficulty" screen shown in FIG. 5 is displayed. On the "change degree of difficulty" screen, four options 20g to 20j and the cursor 21 are displayed. Further, on the "change degree of difficulty" screen, a mark 22 indicating an option currently being selected and marks 23a and 23b each indicating an unselectable option are also displayed. In FIG. 5, the marks 23a and 23b each indicating an unselectable mode are displayed on the option 20g of "difficult mode" and the option 20i of "easy mode," respectively. Accordingly, these modes cannot be selected at this time point. In order for these modes to become selectable, a "difficult mode key" and an "easy mode key" described below need to be obtained, respectively.

It should be noted that immediately after start of the game of the version A (that is, immediately after start from the beginning but not from the middle of the game having been resumed), a "normal mode" is being selected and the "difficult mode" and the "easy mode" are still unselectable) as shown in FIG. 5. Similarly, also immediately after start of the game of the version B, the "normal mode" is being selected and the difficult mode" and the easy mode" are still unselectable.

When the "difficult mode" is selected, a level of a particular enemy character in the game world is higher than in the "normal mode," which makes the enemy character less easy to defeat. When the "easy mode" is selected, the level of the particular enemy character is lower than in the "normal mode," which makes the enemy character easier to defeat. An experience point (value which affects growth of a player character) obtained when the particular enemy character is defeated in the "difficult mode" is greater than that in the "normal mode." Meanwhile, an experience point obtained when the particular enemy character is defeated in the "easy mode" is the same as that in the "normal mode."

Figure 6:
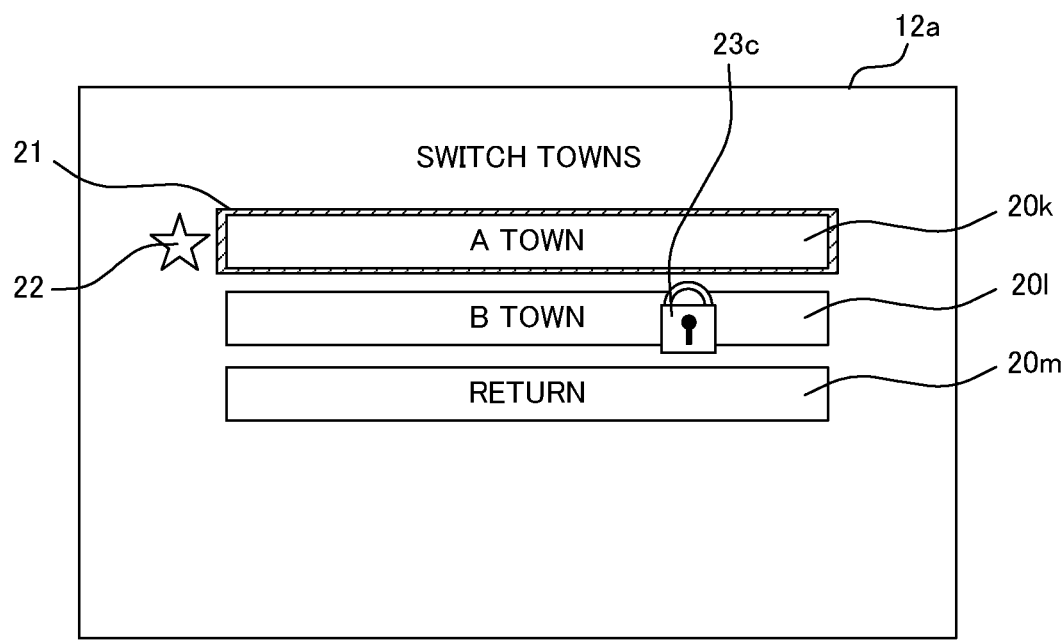

When the user A selects the option 20e of "switch towns" in FIG. 4, a "switch towns" screen shown in FIG. 6 is displayed. On the "switch towns" screen, three options 20k to 20m and the cursor 21 are displayed. Further, on the "switch towns" screen, the mark 22 indicating an option currently being selected and a mark 23c indicating an unselectable option are also displayed. In FIG. 6, the mark 23c indicating an unselectable mode is displayed on the option 20l of "B town." Accordingly, the "B town" cannot be selected at this time point. In order for the "B town" to become selectable, a "B town key" described below needs to be obtained.

It should be noted that the "A town" is being selected and the "B town" is still unselectable as shown in FIG. 6 immediately after the start of the game of version A. Meanwhile, the "B town" is being selected and the "A town" is still unselectable immediately after the start of the game of the version B.

Next, methods of obtaining respective various keys such as the above-described "difficult mode key" and the like will be described with reference to FIG. 7 and FIG. 8.

In the exemplary embodiment, four keys which are the "easy mode key," the "difficult mode key," an "A town key," and the "B town key" are provided. However, in the game of the version A, only the "easy mode key" and the "A town key" can be obtained while only the difficult mode key" and the "B town key" can be obtained in the game of the version B.

For example, in the game of the version A, the "easy mode key" can be obtained when a condition A1 (for example, the game is cleared (that is, a main objective of the game is attained)) is satisfied while the "A town key" can be obtained when a condition A2 (for example, a particular enemy character is defeated) is satisfied as shown in FIG. 7. However, the other keys (the "difficult mode key" and the "B town key") cannot be obtained by just playing the game of the version A.

Meanwhile, in the game of the version B, the "difficult mode key" can be obtained when a condition B1 (for example the game is cleared (that is, a main objective of the game is attained)) is satisfied while the "B town key" can be obtained when a condition B2 (for example, a particular enemy character is defeated) is satisfied as shown in FIG. 8. However, the other keys (the "easy mode key" and the "A town key") cannot be obtained by just playing the game of the version B.

Figure 9:
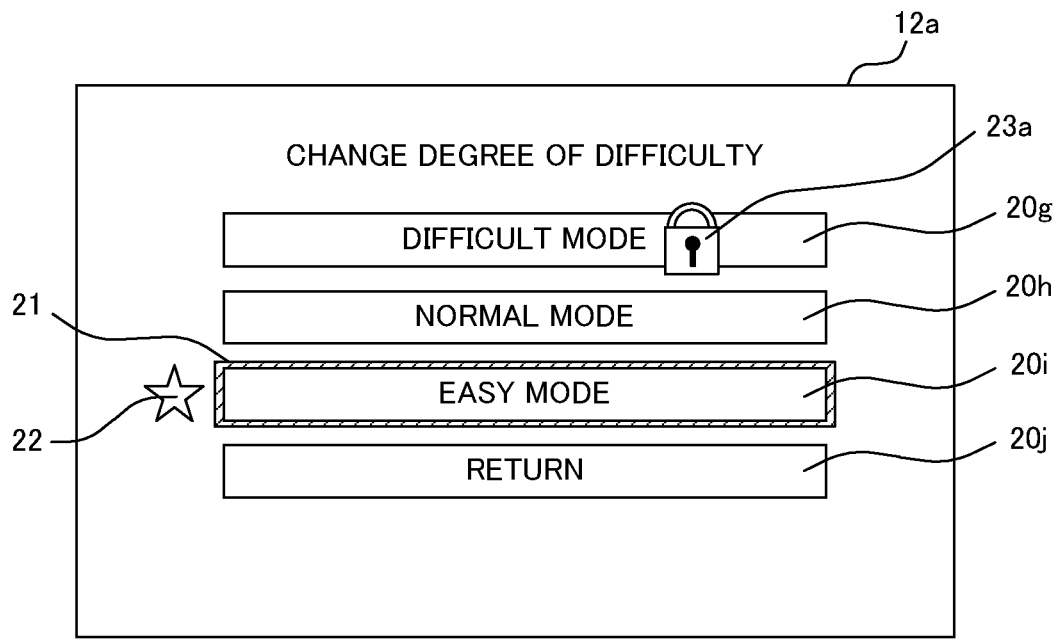

The user A of the hand-held game apparatus 10a can obtain the "easy mode key" by satisfying the above described condition A1 in the game of the version A. Once the "easy mode key" is obtained, in the game of the version A, the mark 23b (FIG. 5) displayed on the "change degree of difficulty" screen is deleted and the option 20i of "easy mode" can be selected as shown in FIG. 9.

Similarly, the user A of the hand-held game apparatus 10a can obtain the "A town key" by satisfying the above described condition A2 in the game of the version A. It should be noted that, in the game of the version A, the option 20k of "A town" is selectable from the start as shown in FIG. 6. Accordingly, no particular change is made on a content of the "switch towns" screen even if the "A town key" is obtained.

In order to make an option which is unselectable in an initial state selectable, in addition to the method of satisfying a predetermined condition in the game and thereby obtaining a corresponding key as described above, there is provided a method of receiving a corresponding key from another hand-held game apparatus 10. Hereinafter, the method will be described in detail.

When the user A selects the option 20b of "transmit/receive key" in FIG. 3, the hand-held game apparatus 10a transmits/receives a key to/from another hand-held game apparatus via an infrared communication device 16a. For example, in FIG. 2, a key possessed in the hand-held game apparatus 10a is transmitted to the hand-held game apparatus 10b by an infrared signal and simultaneously a key possessed in the hand-held game apparatus 10b is transmitted to the hand-held game apparatus 10a by an infrared signal.

For example, when the "difficult mode key" is possessed in the hand-held game apparatus 10b, the hand-held game apparatus 10a receives the "difficult mode key" from the hand-held game apparatus 10b. In the hand-held game apparatus 10a, once the "difficult mode key" is received, the mark 23a (FIG. 5) is deleted and thereafter the option 20g of "difficult mode" can be selected.

Similarly, when the "B town key" is possessed in the hand-held game apparatus 10b, the hand-held game apparatus 10a receives the "B town key" from the hand-held game apparatus 10b. In the hand-held game apparatus 10a, once the "B town key" is received, the mark 23c (FIG. 6) is deleted and thereafter the option 20l of "B town" can be selected.

Next, an operation of the hand-held game apparatus 10a will be described in detail with reference to FIG. 10 to FIG. 13.

Figure 10:
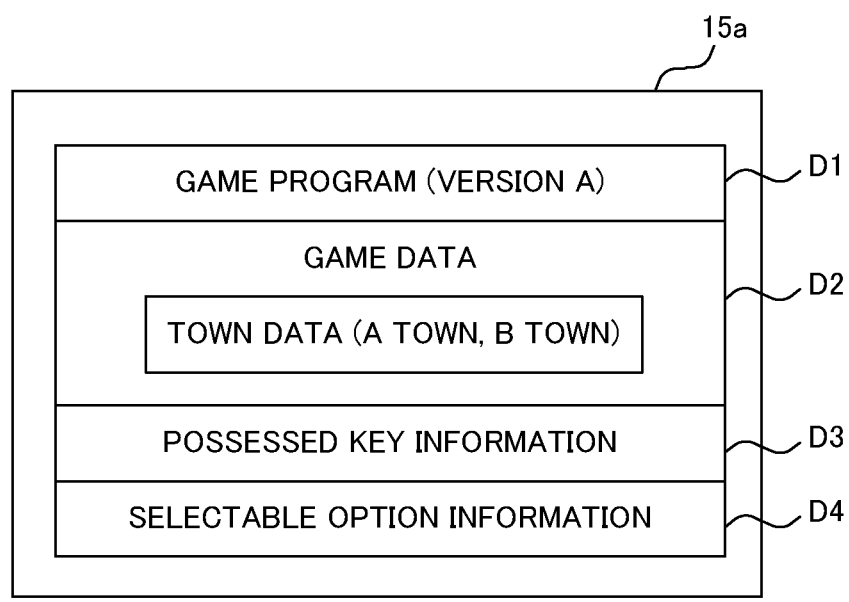

FIG. 10 shows an example of a program and information stored in a main memory 15a of the hand-held game apparatus 10a.

A game program D1 is a computer program for causing a processor 13a to execute the game of the version A. The game program D1 is read from the external storage unit 17a and loaded into the main memory 15a.

Game data D2 is data necessary for executing the game and includes data of towns (town data of the A town, town data of the B town, and the like) located in the game world.

Figure 11:
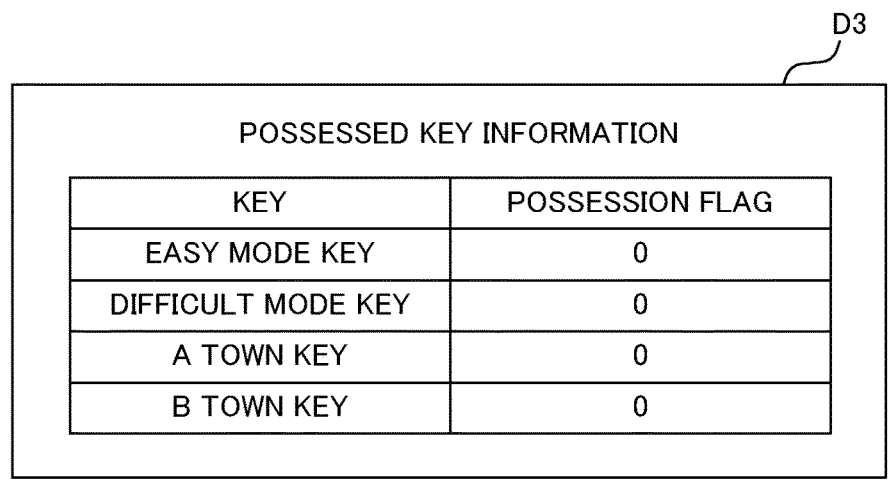
FIG. 11 is a diagram illustrating a non-limiting example of possessed key information.

Possessed key information D3 is information indicating which key is possessed. FIG. 11 shows a specific example of the possessed key information D3. In FIG. 11, a possession flag is set to "0" with respect to a key which is not possessed while a possession flag is set to "1" with respect to a key which is possessed.

Figure 12:
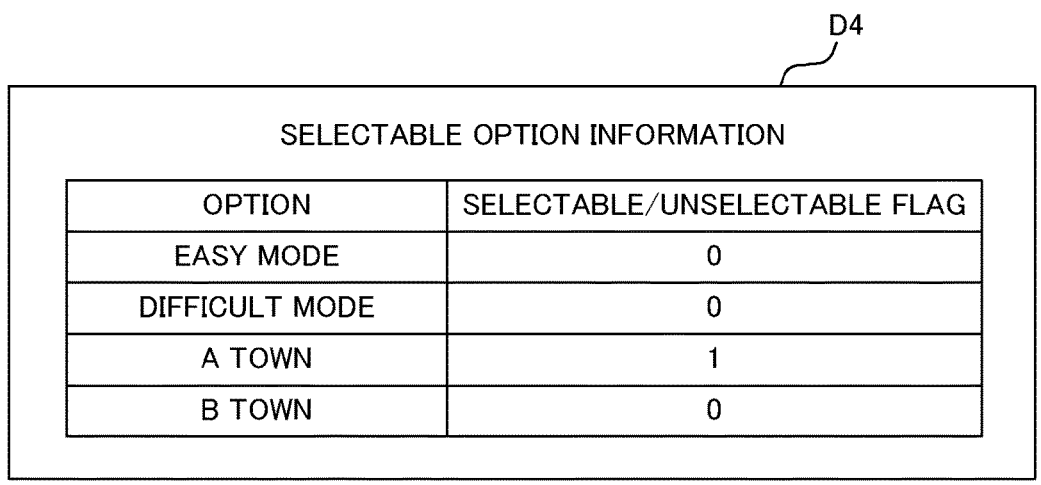
FIG. 12 is a diagram illustrating a non-limiting example of selectable option information.

Selectable option information D4 is information indicating which option is selectable. FIG. 12 shows a specific example of the selectable option information D4. In FIG. 12, a selectable/unselectable flag is set to "0" with respect to an unselectable option while a selectable/unselectable flag is set to "1" with respect to a selectable option.

Next, a flow of processing executed by the processor 13a of the hand-held game apparatus 10a based on the game program D1 will be described with reference to a flow chart of FIG. 13.

Figure 13:
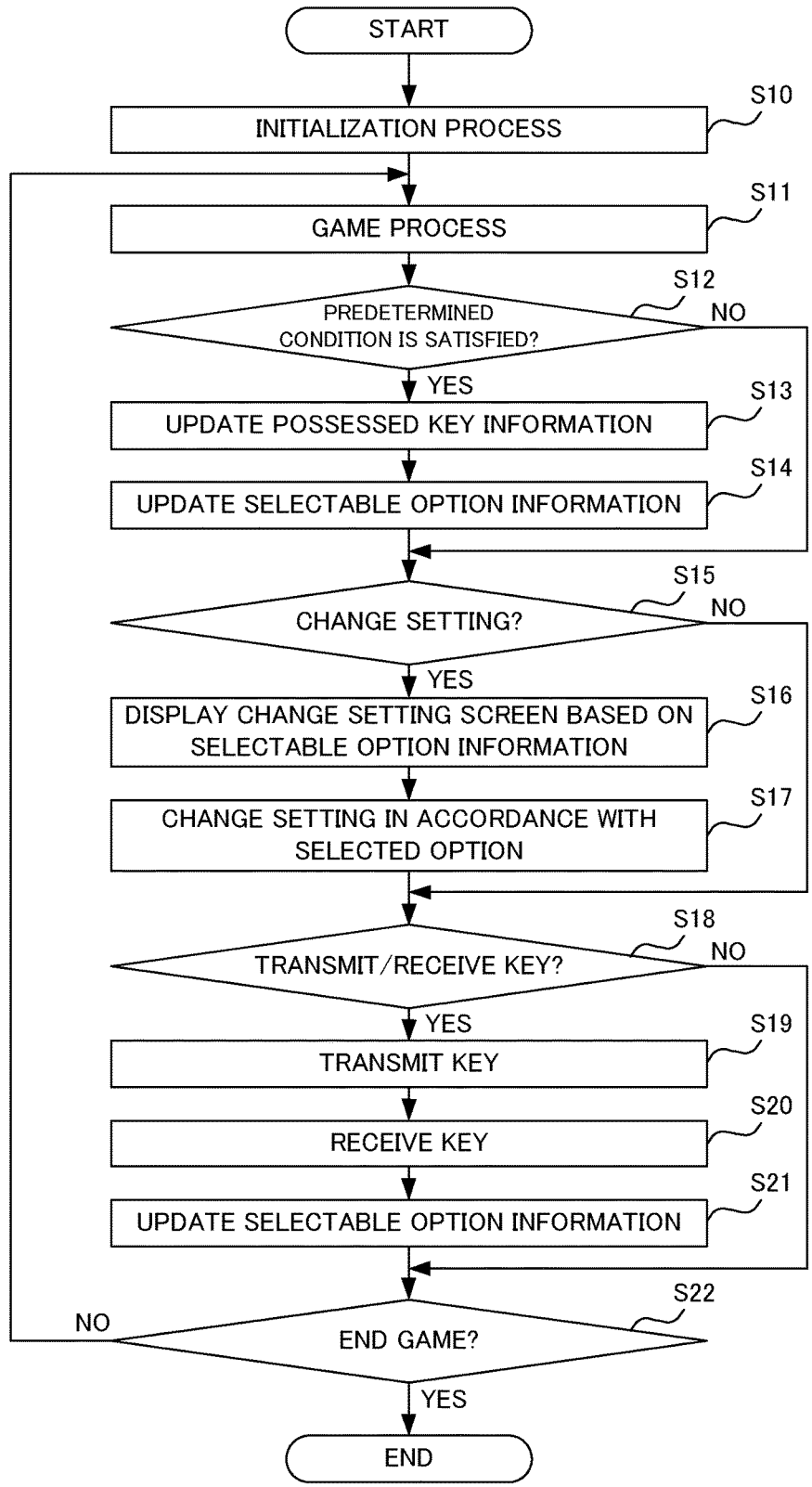
FIG. 13 is a flow chart illustrating a non-limiting example of processing executed by a processor 13.

Upon start of execution of the game program D1, the processor 13a firstly performs an initialization process in step S10 of FIG. 13. In the initialization process, for example, a process of setting respective possession flags of all of the keys to "0" as shown in FIG. 11 and a process of setting respective selectable/unselectable flags of the "easy mode," the "difficult mode," and the "B town" to "0" and setting a selectable/unselectable flag of the "A town" to "1" as shown in FIG. 12, and the like are performed. It should be noted that when the game having been suspended in the middle of the game is resumed, these flags are set in accordance with a content of save data saved when the game was suspended.

In step S11, the processor 13a performs a game process. The game process includes, for example, a process of controlling the player character in accordance with a signal from the input device 11, a process of controlling a non-player character based on a predetermined algorithm, a process of causing a predetermined event in the game world, a process of generating a game image and outputting the game image to the display device 12, and the like.

In step S12, the processor 13a determines whether a result of the game process satisfies a predetermined condition (the condition A1 or the condition A2). Then, when the predetermined condition is satisfied, the processor 13a proceeds the processing to step S13. Otherwise, the processor 13a proceeds the processing to S15.

In step S13, the processor 13a updates the possessed key information D3. Specifically, the processor 13a changes a possession flag of a key corresponding to the satisfied condition to "1." For example, the processor 13a changes the possession flag of the "easy mode key" to "1" when the condition A1 is satisfied and changes the possession flag of the "A town key" to "1" when the condition A2 is satisfied.

In step S14, the processor 13a updates the selectable option information D4. Specifically, the processor 13a changes a selectable/unselectable flag of an option corresponding to a newly obtained key to "1." For example, when the "easy mode key" is obtained, the processor 13a changes the selectable/unselectable flag of the "easy mode" to "1." It should be noted that because the selectable/unselectable flag of the "A town" is initially set to "1," the selectable/unselectable flag of the "A town" remains "1" when the "A town key" is obtained.

In step S15, the processor 13a determines whether a screen for changing settings (specifically, the "change degree of difficulty" screen (FIG. 5) or the "switch towns" screen (FIG. 6)) has been called up by the user. Then, when the screen for changing the settings has been called up, the processor 13a proceeds the processing to step S16. Otherwise, the processor 13a proceeds the processing to S18.

In step S16, the processor 13a displays the screen for changing the settings (FIG. 5, FIG. 6) based on the selectable option information D4. Specifically, with respect to options whose selectable/unselectable flags are set to "0" in the selectable option information D4, the processor 13a displays the marks (23a to 23c) each indicating that the option is unselectable, respectively.

In step S17, the processor 13a changes the settings of the game in accordance with an option selected by the user. For example, when the "easy mode" is selected by the user, the processor 13a sets a level of a particular enemy character of the game world so as to be lower than in the "normal mode" so that the particular enemy character is easier to defeat. Further, for example, when the "B town" is selected by the user, the processor 13a changes the town located at the predetermined position in the game world from the "A town" to the "B town."

That is, the processor 13a changes the town data in the game data D2 which is used during the game process from the town data of the "A town" to the town data of the "B town."

In step S18, the processor 13a determines whether a key transmission/reception instruction has been issued by the user. Then, when the key transmission/reception instruction has been issued, the processor 13a proceeds the processing to step S19. Otherwise, the processor 13a proceeds the processing to S22.

In step S19, the processor 13a transmits a key whose possession flag is set to "1" in the possessed key information D3 to the other hand-held game apparatus 10b via the infrared communication device 16.

In step S20, the processor 13a receives a key possessed by the other hand-held game apparatus 10b via the infrared communication device 16.

In step S21, the processor 13a updates the selectable option information D4 based on the received key. Specifically, the processor 13a changes a selectable/unselectable flag of an option corresponding to the received key to "1" in the selectable option information D4. For example, when the "difficult mode key" is received from the other hand-held game apparatus 10b, the processor 13a changes the selectable/unselectable flag of the "difficult mode" to "1."

In step S22, the processor 13a determines whether or not to end the game. Then, when the processor 13a determines to end the game, the processor 13a saves save data (data for later resuming the game from where the game was suspended) in an internal storage unit 14a, the external storage unit 17a, or the like, as appropriate, and ends the execution of the game program D1. The save data includes the possessed key information D3 and the selectable option information D4. When the processor 13a determines not to end the game, the processor 13a returns the processing to step S11.

FIG. 10 to FIG. 13 show the program, the information, the flow chart related to the game of the version A. It should be noted that a program, information, and a flow chart related to the game of the version B are basically the same as those related to the game of the version A. However, those related to the game of the version B are different from those related to the game of the version A at least in the following points.

That the selectable/unselectable flag of the "A town" is set to "0" and the selectable/unselectable flag of the "B town" is set to "1" in step S10.

That it is determined whether the condition B1 or the condition B2 is satisfied in step S12.

As described above, according to the exemplary embodiment, a setting item which cannot be selected by simply playing one of the game of the version A and the game of the version B can become selectable by receiving a key which is obtained by playing the game of the other version. Accordingly, transmission/reception of keys between users who own games of different versions is promoted and thereby communication between the users can be activated.

Further, according to the exemplary embodiment, in the initial state, the "A town" is located at a particular position in the game world in the game of the version A. Meanwhile, in the game of the version B, the "B town" is located instead of the "A town" at the particular position in the game world which is basically the same as the game world of the version A. However, according to the exemplary embodiment, for example, by receiving the "B town key," the "B town" can be caused to appear also in the game world of the game of the version A. Similarly, by receiving the "A town key," the "A town" can be caused to appear also in the game world of the game of the version B. Accordingly, for example, a user who owns the game program of the version A can receive the "B town key" from another user who owns the game program of the version B, and thereby use the "B town" in the game of the version A without purchasing the game program of the version B. Further, as for a user who owns both of the game program of the version A and the game program of the version B, when the user desires to use the "B town" in the middle of playing the game of the version A, the user can call up the screen for changing the settings and cause the "B town" to appear in the game world easily. Thus, there is no need for the user to switch between the external storage units 17a, 17b which store the game programs of the respective versions and to start up the game program of the other version, which is convenient for the user.

Further, according to the exemplary embodiment, the "difficult mode" cannot be selected by normal game play in the game of the version A while the "easy mode" cannot be selected by normal game play in the game of the version B. However, according to the exemplary embodiment, for example, the "difficult mode" can be selected also in the game of the version A by receiving the "difficult mode key." Similarly, the "easy mode" can be selected also in the game of the version B by receiving the "easy mode key." Accordingly, for example, even after the user who owns the game program of the version A has cleared the game of the version A, the user can receive the difficult mode key" from another user who owns the game program of the version B, and thereby try the "difficult mode" in the game of the version A. Further, even when the user who owns the game program of the version B finds the "normal mode" of the game of the version B too difficult and cannot advance the game, the user can receive the "easy mode key" from another user (a friend who is a good game player, a family member, and the like) who owns the game program of the version A, and thereby change the game of the version B to the "easy mode" and advance the game.

It is noted that the above exemplary embodiment is only for illustrative purposes and numerous other modifications can be devised.

For example, in the above exemplary embodiment, the hand-held game apparatus 10 is used. However, the present technology is not limited thereto, and any information processor (e.g., a stationary game apparatus, a mobile phone, a smartphone, a desk top computer, a notebook computer, and the like) may be used.

Further, in the exemplary embodiment, key transmission/reception is performed via infrared communication. However, the exemplary embodiment is not limited thereto, and the key transmission/reception may be performed via wireless communication based on any method, may be performed via a communication cable, or may be performed via a server apparatus on a network. Further, instead of transmitting/receiving a key, a password or save data may be used. For example, a character string (password) corresponding to a key possessed by the hand-held game apparatus 10b may be displayed on a display device 12b of the hand-held game apparatus 10b, and the displayed character string may be inputted to the hand-held game apparatus 10a via an input device 11a of the hand-held game apparatus 10a. Further, for example, the possessed key information D3 included in the save data saved in the hand-held game apparatus 10b may be read out by the processor 13a of the hand-held game apparatus 10a.

Further, in the exemplary embodiment, the two hand-held game apparatuses 10a, 10b are used. However, the exemplary embodiment is not limited thereto, and only the single hand-held game apparatus 10a may be used and the game of the version A and the game of the version B may be alternately played by switching between the two external storage units 17a, 17b.

Further, in the exemplary embodiment, keys are transmitted/received between the games (game programs) of the different versions of the same title. However, the exemplary embodiment is not limited thereto, and keys may be transmitted/received between games (game programs) of different titles.

Further, in the exemplary embodiment, with respect to unselectable options, the marks (23a to 23c) indicating that the options are unselectable are displayed, respectively in the screen for changing the settings (FIG. 5, FIG. 6). However, the exemplary embodiment is not limited thereto, and the user may be informed of an unselectable option by any other method. For example, an unselectable item may be grayed out or hidden.

Further, in the exemplary embodiment, an example in which the degree of difficulty of the game and the towns are changed has been described. However, the exemplary embodiment is not limited thereto. For example, not only the towns but also any faculty or area located in the game world may be changed.

Further, in the above exemplary embodiment, the plurality of processes shown in FIG. 13 are executed by a single computer (the processor 13a). However, in another embodiment, the plurality of processes may be shared and executed by a plurality of computers.

Further, in another embodiment, a part of or all of the plurality of processes may be realized by a dedicated circuit.

Further, in the above exemplary embodiment, the plurality of processes shown in FIG. 13 are executed in a single information processor (the hand-held game apparatus 10a). However, in another embodiment, the plurality of processes may be shared and executed by a plurality of information processors (e.g., the hand-held game apparatus 10a and a server apparatus).

Further, in the exemplary embodiment, the game program D1 is loaded into the main memory 15a from the external storage unit 17a. In another exemplary embodiment, the game program D1 may be loaded into the main memory 15a from the internal storage unit 14a. Still, in another exemplary embodiment, the game program D1 may be received from the hand-held game apparatus 10b or the server apparatus and loaded into the main memory 15a.

What is claimed is:

1. A game system including a single or a plurality of game apparatuses, the game system comprising:
   at least one input unit;
   a first game execution unit which executes a first game in accordance with an instruction of a player inputted via the at least one input unit, wherein
   the first game execution unit includes a first processing system configured to set a particular first game data to be accessible immediately after a start from a beginning of the first game even if any stages of the first game are not completed; and
   a second game execution unit which executes a second game in accordance with an instruction of the player inputted via the at least one input unit, wherein
   the second game execution unit includes
   a second processing system having at least one processor, the second processing system configured to
   set the particular first game data, which is accessible in the first game immediately after the start from the beginning of the first game, in a storage associated with the second game execution unit so as to be inaccessible in the second game from a start from a beginning of the second game and while an execution result of the first game does not satisfy a predetermined condition, and
   set the particular first game data so as to be accessible also in the second game in response to the execution result of the first game having satisfied the predetermined condition.

2. The game system according to claim 1, wherein the first game execution unit includes:
   a first processing system including at least one processor, the first processing system configured to:
   determine whether the execution result of the first game satisfies the predetermined condition;
   enable output of predetermined first data indicating that the execution result of the first game satisfies the predetermined condition in response to the execution result of the first game having satisfied the predetermined condition; and
   a first data output unit which outputs the first data, and
   the second game execution unit includes
   a first data input unit which receives the first data, and
   wherein the second processing system is further configured to set the particular first game data which is accessible in the first game so as to be inaccessible in the second game when the first data is yet to be received, and set the particular first game data so as to be accessible also in the second game in response to the first data having been received.

3. The game system according to claim 2, wherein
   the first data output unit transmits a signal representing the first data via wireless communication, thereby outputting the first data, and
   the first data input unit receives the signal via wireless communication, thereby receiving the first data.

4. The game system according to claim 1, wherein the second processing system is further configured to
   set a particular faculty or area existing in a game world of the first game so as to be inaccessible in the second game when the execution result of the first game does not satisfy the predetermined condition, and set the particular faculty or area so as to be accessible also in the second game in response to the execution result of the first game having satisfied the predetermined condition.

5. The game system according to claim 1, wherein the second processing unit is further configured to
   set a game mode of a particular degree of difficulty which is accessible in the first game so as to be inaccessible in the second game when the execution result of the first game does not satisfy the predetermined condition, and set the game mode of the particular degree of difficulty so as to be accessible also in the second game in response to the execution result of the first game having satisfied the predetermined condition.

6. The game system according to claim 1, wherein
   the first game execution unit includes
   a first display control unit configured to cause a display device to display a setting change screen for urging the player to select whether or not to use the particular first game data, and
   the first display control unit further configured to cause the display device to display the setting change screen in a different display mode in accordance with whether the particular first game data is set so as to be accessible by the second game execution unit.

7. The game system according to claim 1, wherein the first processing system is further configured to set
   particular second game data in a storage associated with the first game execution unit or a second game mode which is accessible in the second game so as to be inaccessible in the first game when an execution result of the second game does not satisfy a second predetermined condition, and set the particular second game data or the second game mode so as to be accessible also in the first game in response to the execution result of the second game having satisfied the second predetermined condition.

8. The game system according to claim 1, further comprising:
a first game apparatus which includes a first input unit of the at least one input unit and the first game execution unit; and
a second game apparatus which includes a second input unit of the at least one input unit and the second game execution unit.

9. The game system according to claim 1, further comprising:
a first storage medium having stored therein a first game program for causing the game apparatus to operate as the first game execution unit; and
a second storage medium having stored therein a second game program for causing the game apparatus to operate as the second game execution unit, wherein
the game apparatus can selectively access one of the first storage medium and the second storage medium.

10. The game system according to claim 1, wherein the first game and the second game are different versions of a same game title.

11. A computer-readable non-transitory storage medium having stored therein a game program to be executed in a game system including a single or a plurality of game apparatuses and comprising at least one input unit, the game program causing a computer of the game apparatus to execute:
a first game execution process of executing a first game in accordance with an instruction of a player inputted via the at least one input unit, wherein the first game execution process includes setting a particular first game data to be accessible immediately after a start from a beginning of the first game even if any stages of the first game are not completed; and
a second game execution process of executing a second game in accordance with an instruction of the player inputted via the at least one input unit, wherein
the second game execution process includes a second setting process of setting the particular first game data, which is accessible in the first game immediately after the start from the beginning of the first game, in a storage associated with the second execution unit so as to be inaccessible in the second game from a start from a beginning of the second game and while an execution result of the first game does not satisfy a predetermined condition, and setting the particular first game data so as to be accessible also in the second game in response to the execution result of the first game having satisfied the predetermined condition.

12. A game processing method performed in a game system including a single or a plurality of game apparatuses and comprising at least one input unit, the game processing method comprising:
executing a first game process in accordance with an instruction of a player inputted via the at least one input unit, wherein the first game process includes setting a particular first game data to be accessible immediately after a start from a beginning of the first game even if any stages of the first game are not completed; and
executing a second game process in accordance with an instruction of the player inputted via the at least one input unit, wherein
the second game process includes a second setting process of setting the particular first game data, which is accessible in the first game process immediately after the start from the beginning of the first game, in a storage associated with the second execution unit so as to be inaccessible in the second game process from a start from a beginning of the second game and while an execution result of the first game process does not satisfy a predetermined condition, and setting the particular first game data so as to be accessible also in the second game process in response to the execution result of the first game process having satisfied the predetermined condition.

13. A game apparatus comprising:
an input unit;
a first game execution unit configured to execute a first game in accordance with an instruction of a player inputted via the input unit, wherein the first game execution unit includes a first processing system configured to set a particular first game data to be accessible immediately after a start from a beginning of the first game even if any stages of the first game are not completed; and
a second game execution unit configured to execute a second game in accordance with an instruction of the player inputted via the input unit, wherein
the second game execution unit is further configured to set the particular first game data, which is accessible in the first game immediately after the start from the beginning of the first game, in a storage associated with the second execution unit so as to be inaccessible in the second game from a start from a beginning of the second game and while an execution result of the first game does not satisfy a predetermined condition, and
set the particular first game data so as to be accessible also in the second game in response to the execution result of the first game having satisfied the predetermined condition.

14. The computer-readable medium according to claim 11, wherein
the first game execution process includes: determining whether the execution result of the first game satisfies the predetermined condition; enabling output of predetermined first data indicating that the execution result of the first game satisfies the predetermined condition in response to the execution result of the first game having satisfied the predetermined condition; and outputting the first data, and
wherein the second game execution process includes: receiving the first data; setting the particular first game data which is accessible in the first game so as to be inaccessible in the second game when the first data is yet to be received; and setting the particular first game data so as to be accessible also in the second game in response to the first data having been received.

15. The game apparatus according to claim 13, wherein
the first game execution unit is further configured to perform: determining whether the execution result of the first game satisfies the predetermined condition; enabling output of predetermined first data indicating that the execution result of the first game satisfies the predetermined condition in response to the execution result of the first game having satisfied the predetermined condition; and outputting the first data, and
wherein the second game execution unit is further configured to perform: receiving the first data; setting the particular first game data or the first game mode which is accessible in the first game so as to be inaccessible in the second game when the first data is yet to be received; and setting the particular first game data or the first game mode so as to be accessible also in the second game in response to the first data having been received.

16. The game processing method according to claim 12, wherein the first game process includes: determining whether the execution result of the first game satisfies the predetermined condition; enabling output of predetermined first data indicating that the execution result of the first game satisfies the predetermined condition in response to the execution result of the first game having satisfied the predetermined condition; and outputting the first data, and wherein the second game process includes: receiving the first data; setting the particular first game data which is accessible in the first game so as to be inaccessible in the second game when the first data is yet to be received; and setting the particular first game data so as to be accessible also in the second game in response to the first data having been received.

* * * * *